United States Patent [19]

Ashman et al.

[11] Patent Number: 4,524,677
[45] Date of Patent: Jun. 25, 1985

[54] SEALS USED IN PISTON AND CYLINDER ARRANGEMENTS

[75] Inventors: Glynn Ashman; Kelvin T. Berry; Martin E. Winterbottom, all of West Midlands, England

[73] Assignee: Lucas Industries Limited, Birmingham, England

[21] Appl. No.: 445,232

[22] Filed: Nov. 29, 1982

[30] Foreign Application Priority Data

Dec. 1, 1981 [GB] United Kingdom ............... 8136199

[51] Int. Cl.³ .............................................. F16J 15/18
[52] U.S. Cl. .................................... 92/168; 188/72.4; 188/73.31; 277/212 FB
[58] Field of Search ............. 92/168; 188/73.31, 72.4, 188/218 A, 370; 74/18.2; 277/212 FB, DIG. 4

[56] References Cited

U.S. PATENT DOCUMENTS

| B 350,843 | 1/1975 | Gautier | 92/168 |
|---|---|---|---|
| 1,914,600 | 6/1933 | Hewitt | 74/18.2 |
| 2,950,499 | 8/1960 | Schlage | 74/18.2 |
| 3,114,568 | 12/1963 | Buono | 74/18.2 |
| 3,244,013 | 4/1966 | Deschner | 74/18.2 |
| 3,490,343 | 1/1970 | Afanador et al. | 92/168 |
| 3,497,038 | 2/1970 | Schrader et al. | 92/168 |
| 3,528,301 | 9/1970 | Wasmer | 92/168 |
| 3,631,767 | 1/1972 | Meier | 188/370 X |
| 3,661,231 | 5/1972 | Beller et al. | 92/168 |
| 4,121,845 | 11/1978 | Reynolds et al. | 188/72.4 |
| 4,248,328 | 2/1981 | Klassen | 188/73.3 |
| 4,248,329 | 2/1981 | Torigoe | 92/168 |
| 4,324,318 | 4/1982 | Karasudani | 188/73.31 |

FOREIGN PATENT DOCUMENTS

| 0013105 | 7/1980 | European Pat. Off. | 277/DIG. 4 |
|---|---|---|---|
| 1625932 | 1/1970 | Fed. Rep. of Germany | 277/212 FB |
| 2921056 | 11/1979 | Fed. Rep. of Germany | 188/72.4 |
| 3111576 | 3/1982 | Fed. Rep. of Germany | 92/168 |
| 2017825A | 11/1979 | United Kingdom | 188/72.4 |
| 2041122A | 9/1980 | United Kingdom | 188/72.4 |

Primary Examiner—Sheldon J. Richter
Assistant Examiner—Randolph A. Smith
Attorney, Agent, or Firm—Scrivener Clark Scrivener and Johnson

[57] ABSTRACT

The present specification relates to a piston and cylinder arrangement for use in a vehicle disc brake. Such arrangements are either hydraulically or pneumatically operable. In disc brakes the piston and cylinder of the brake actuator are usually sealed against the ingress of dirt, by a flexible boot arranged between the piston and cylinder at the cylinder open end. Additionally a separate pressure seal is advantageously provided between the piston and cylinder. The present invention provides for a flexible boot which engages in retaining grooves provided on the outside of the piston and on the inside wall of the cylinder adjacent to the open end of the cylinder, the part of the flexible boot engaging in the retaining groove in the inside wall of the cylinder, being compressed radially of the cylinder to thus act as a pressure seal between the piston and cylinder. By virtue of this dual function, the piston can be shortened and the weight of the arrangement induced. Also assembly is simplified.

4 Claims, 4 Drawing Figures

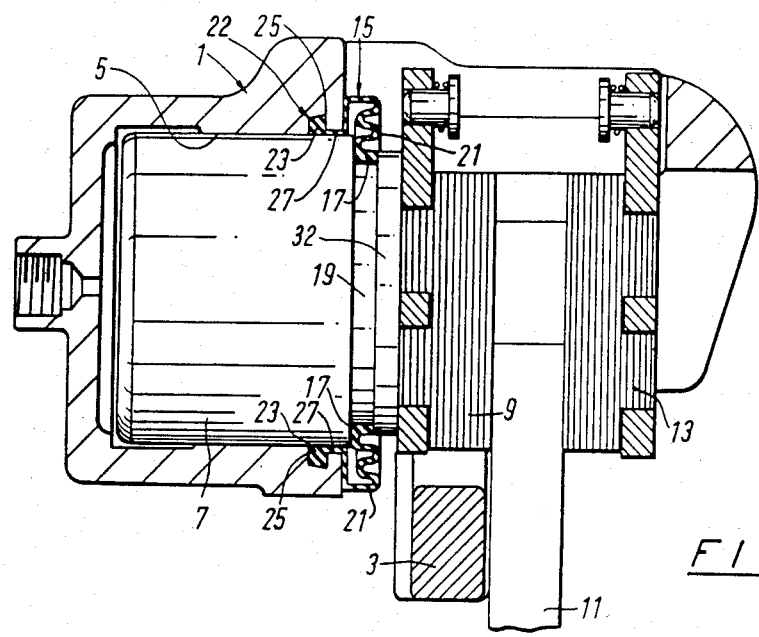
FIG.1
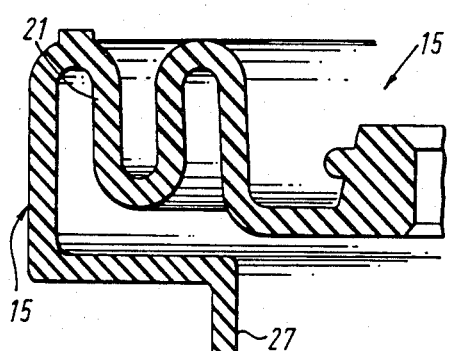
FIG.2
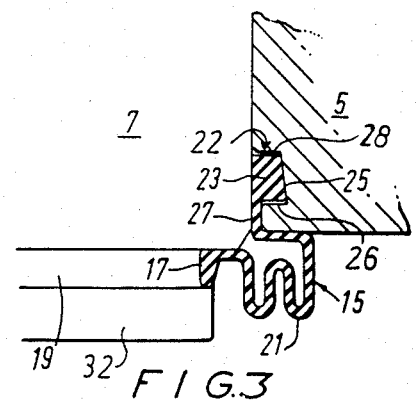
FIG.3
FIG.4

SEALS USED IN PISTON AND CYLINDER ARRANGEMENTS

DESCRIPTION

The present invention relates to a piston and cylinder arrangement, and the seals provided therebetween to enable the piston and cylinder to continuously work as desired.

In particular the present invention relates to the piston and cylinder arrangement used in a vehicle brake as the brake actuator. Such arrangements are either hydraulically or pneumatically operable. In disc brakes it is common for the piston and cylinder of the brake actuator to be effectively sealed against the ingress of dirt by a flexible boot arranged between the piston and cylinder at the cylinder open end. Such a flexible boot is shown in British Patent Specification No. 1239885, this boot merely protecting the sliding surface between piston and cylinder by covering the gap therebetween at the open end of the cylinder. It has also been proposed, as disclosed in U.S. Pat. No. 3,490,343, to provide such a flexible boot as previously described, with a wiper lip which engages the outer sliding surface of the piston. This wiper lip provides dual protection by maintaining protection against the ingress of dirt between cylinder and piston, should the flexible boot fracture during service.

Both of the above prior arrangements still require the presence of a separate pressure seal. The pressure seal is either in a groove in the cylinder housing, as in British Patent Specification No. 1239885, or in the piston, as in U.S. Pat. No. 3,490,343. This pressure seal is advantageous to the performance of all disc brakes both to prevent fluid leakage past the piston and loss of pressure, and to provide an automatic piston retraction i.e. rollback, facility, upon brake release. This latter rollback facility is due to the grip between the piston and seal, or seal and cylinder, and the resilience of the pressure seal. When the brake is released the pressure seal returns to its original configuration, dragging back the piston into the cylinder. This facility is dependent upon several factors e.g. seal material, groove form, etc.

However the provision of both the advantageous pressure seal and the flexible boot, necessitates the piston to be of a certain axial length. Also two retaining grooves can be required in the piston or cylinder, and the seals have to be separately assembled.

The aim of the present invention is to provide a piston and cylinder arrangement with the fundamentally required flexible boot and pressure seal, which construction is simpler to manufacture and assemble than prior art constructions, and additionally has some further advantages.

According to the present invention there is provided a piston and cylinder arrangement comprising a piston axially slidably located in a cylinder, the piston being slidable at least partially, out from one open end of said cylinder, a flexible boot engaging the outside of the piston and the inside wall of the cylinder adjacent to said one open end of the cylinder, one part of said flexible boot engaging in a retaining groove in the inside wall of the cylinder, and being compressed radially of the cylinder, between the outer wall of the piston and the bottom of the retaining groove in the cylinder wall, to thus form a pressure seal between the piston and cylinder.

Thus the present invention provides a combined flexible dust boot and pressure seal, requiring a reduced number of assembly steps as compared to the assembly of prior art constructions with separate pressure seals and boots. Also, as two seals are now not secured to the piston or cylinder, the axial length of the piston can be reduced for, for example, the same braking actuation and pad wear distance as prior art constructions, with a separate pressure seal and flexible boot. Thus the cylinder length can be reduced and the caliper reduced in overall size. This means an advantageous reduction in brake weight whilst retaining the same brake performance. Also, the number of retaining grooves is reduced as compared to prior art constructions with a separate pressure seal. Thus manufacturing time and cost are thereby reduced, as is assembly time.

The main criterion of the present invention is that the part of the flexible boot held in the retaining groove in the inside wall of the cylinder, is radially compressed between the piston and the base of the groove, thereby forming the required pressure seal. No compression axially of the piston and cylinder is required. The seal in the present invention extends from the retaining groove in the cylinder wall, along the widened cylinder between the cylinder and piston, to the open end of the cylinder. The gap between the piston and the widened end of the cylinder is sufficient to allow the flexible boot to freely pass therethrough.

In operation, the pressure seal part of the flexible boot tends to be extended between the piston and cylinder, and to ensure that the pressure seal part is retained in the groove in the cylinder in anti-extrusion or reinforcing ring may be moulded into the pressure seal part or the part of the seal which extends between the piston and cylinder.

Further, whilst the combined flexible boot and pressure seal is preferably made of the same resilient material e.g. Ethylene Propylene Dienterpolymer, and is of integral construction, the pressure seal part and flexible boot may, if desired, be made separately and of different materials, and may be joined together by an intermediate arrangement.

The present invention will now be further described, by way of example, with reference to the accompanying drawings, in which:

FIG. 1 is a cross-sectional view of a disc brake incorporating one embodiment of a piston and cylinder arrangement according to the present invention;

FIG. 2 is an enlarged cross-sectional view of part of the combined flexible boot and pressure seal used in FIG. 1;

FIG. 3 shows how the combined flexible boot and pressure seal of FIGS. 1 and 2, is installed in a piston and cylinder; and FIG. 4 is a fiew similar to FIG. 2 but showing the boot and seal parts made separately of different materials.

Considersing FIG. 1 of the accompanying drawings, a disc brake is shown in cross-section, the brake comprising a caliper 1 and torque taking member 3. The caliper 1 defines a cylinder 5 within which a piston 7 is axially slidable, piston 7 being moved hydraulically (or pneumatically) to press inboard friction pad 9 against disc 11, reactive movement of the caliper 1 pressing outboard friction pad 13 against the opposite side of disc 11. The cylinder is provided with an annular retaining groove 22 adjacent the open end of the cylinder 5, the groove having a bottom wall 25 joining axially spaced front and rear walls 26, 28. The piston 7, in its fully retracted position of FIG. 1 has a portion 32 which extends forwardly of the groove 19.

A pressure seal 23 extends between the sliding surface of the piston 7 and the inside wall of the cylinder 5, as best seen in FIGS. 1 and 3 and is engaged in the retaining groove 22 and compressed radially of the cylinder 5, between the sliding surface of piston 7 and the bottom wall 25 of retaining groove 22. As can be seen in FIG. 1, the pressure seal 23 is the sole sliding seal between the piston and cylinder.

A flexible boot 21 has one end 17 engaging a groove 19 in the forwardly extending portion 32 of the piston and its opposite end joined to the pressure seal 23, the diameter of the cylinder between its front end and the front wall 28 of groove 23 being enlarged to allow free passage therethrough of the portion 27 of the boot from the exterior of the cylinder to the pressure seal 23.

From the foregoing description, it can be seen that the single seal and boot define a member 15 which doubles both as a flexible boot preventing the ingress of dirt to the sliding surfaces of the piston and cylinder, and as a pressure seal preventing the egress of pressure fluid. By obviating the necessity for a separate pressure seal, the present invention when applied to a disc brake, enables the piston and cylinder length to be reduced as compared to prior art arrangements with the same braking performance. Thus the overall size and weight of the brake is reduced with attendant advantages. Further, as only one retaining groove is required in each of the piston and cylinder, fewer machining operations are required as compared with prior art constructions with the separate pressure seal. Thus, manufacturing costs are reduced and assembly is simplified.

To both enhance the 'rollback' facility and retain the pressure seal 23 in retaining groove 22, the bottom wall 25 of retaining groove 22 is preferably angled to deepen the groove towards the open end of cylinder 5. Also, an anti-extrusion or reinforcing ring can be moulded into the pressure seal portion 23 or adjacent seal portion 27 to make sure that the pressure seal portion is not forced completely out of groove 25.

Whilst the combined boot and pressure seal member 15 illustrated in FIGS. 1-3 is moulded as a single integral member, it could be a member 15 as shown in FIG. 4 made from two separately moulded members 21', 23' which are subsequently interconnected by an intermediate arrangement 27' corresponding to the portion 27 shown in FIG. 2. This would enable different materials to be used, if desired, for the pressure seal and flexible dust boot.

The present invention thus provides a piston and cylinder assembly with a combined flexible dust boot and pressure seal, which assembly is simple to assemble, cheaper to manufacture than prior arrangements, and has certain additional advantages, especially if used in a vehicle brake.

We claim:

1. A piston and cylinder arrangement comprising a piston axially slidably located in a cylinder, the piston being slidable at least partially, out from one open end of said cylinder, a retaining groove on the inside wall of the cylinder adjacent the open end thereof, said groove having a bottom wall joining axially spaced front and rear walls, a pressure seal received in said groove and compressed radially of the cylinder between the outer wall of the piston and the bottom of the retaining groove with sufficient force to resist fluid pressure applied to said piston, said pressure seal being the sole sliding seal between said piston and cylinder wall, said piston having a portion extending forwardly of said groove in said cylinder when said piston is in its fully retracted position, and a flexible boot having one end sealingly engaging the forwardly extending portion of said piston and its opposite end joined to said pressure seal, the diameter of said cylinder between its open end and the front wall of the groove in said cylinder being enlarged to allow passage of said flexible boot from the exterior of said cylinder to said pressure seal.

2. A piston and cylinder arrangement according to claim 1 wherein the pressure seal and boot are constructed as two separate parts, said separate parts being interconnected.

3. A piston and cylinder arrangement according to claim 2, wherein said separate parts are made of different materials.

4. A piston and cylinder arrangement according to claim 1, wherein the bottom wall of the retaining groove in the inner wall of the cylinder, for retaining the pressure seal, is tapered radially outwards with respect to the cylinder, towards the open end of the cylinder.

* * * * *